United States Patent [19]
Barraclough
[11] 3,864,180
[45] Feb. 4, 1975

[54] PROCESS FOR FORMING THIN-FILM CIRCUIT DEVICES

[75] Inventor: William D. Barraclough, Simi Valley, Calif.
[73] Assignee: Litton Systems, Inc., Beverly Hills, Calif.
[22] Filed: June 29, 1973
[21] Appl. No.: 374,846

Related U.S. Application Data
[63] Continuation of Ser. No. 165,628, July 23, 1971, abandoned.

[52] U.S. Cl. .......... 156/3, 96/36.2, 156/11
[51] Int. Cl. .......... B32b 31/14, C23f 1/02
[58] Field of Search .......... 156/3, 7, 8, 11, 12, 17; 96/36.2; 29/610; 338/314

[56] References Cited
UNITED STATES PATENTS
3,423,205 1/1969 Skaggs et al. .......... 96/36.2
3,423,260 1/1969 Heath et al. .......... 156/3

*Primary Examiner*—William A. Powell
*Assistant Examiner*—Brian J. Leitten

[57] ABSTRACT

A process for constructing a thin-film circuit device, such as a resistor, utilizing a laminated structure comprising a substrate covered by a thin-film layer of material having electrical characteristics corresponding to the circuit device, which is covered by an intermediate layer constructed of conductive material which in turn is covered by a conductive layer. The conductive layer is selectively etched to form a cavity above the intermediate layer, the size of the cavity being such as to define the dimension between opposite intended contacts for the device. Subsequently, the conductive, intermediate and thin-film layers are selectively etched to form the bounds of the circuit device, and the exposed portion of the intermediate layer between the opposite contacts is then removed.

7 Claims, 12 Drawing Figures

Figure 1:
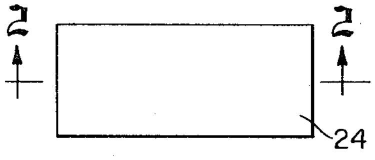

WILLIAM D. BARRACLOUGH
INVENTOR

BY Robert M. Angus

ATTORNEY

PROCESS FOR FORMING THIN-FILM CIRCUIT DEVICES

This is a continuation of application Ser. No. 165,628, filed July 23, 1971, now abandoned.

This invention relates to thin-film circuit devices, and particularly to a process for constructing thin-film, circuit devices by selectively etching conductive and circuit device layers supported by a substrate.

The etching process used in the construction of thin-film devices is ordinarily accomplished by applying a photoresist to an exposed surface through a mask having transparent and opaque portions in a configuration corresponding to a desired etch, developing and removing portions of the exposed photoresist, and etching through the intended layer of the laminated structure with an etchant. Heretofore, contacts for thin-film circuit devices have been constructed by selectively exposing a photoresist to define a desired contact pattern and then etching away excess conductive material to form the completed contacts. The contacts were formed in a single step which was accomplished before forming the pattern of the circuit element.

One problem associated with the process heretofore employed in fabricating thin-film circuit devices resided in the fact that the registration requirements of the masks used to expose the photoresist were such as to limit the number of circuit elements which could be fabricated from a single laminated structure. As a result, the number of circuit elements fabricated during the process was limited, and a significant quantity of material was wasted. Another problem associated with such prior processes resided in the fact that the circuit devices produced by the process were not always reliable. Particularly, if a negative photoresist was utilized to protect the intended circuit element between contacts, open circuits ocasionally resulted between contacts and thin-film circuit layers due to an underexposure of the photoresist. An underexposed or unexposed portion of such negative photoresist resulted in a removal of the protective photoresist from the circuit element layer during development, thereby resulting in etching an open circuit into the layer when the bounds of the layer were subsequently defined. Also, such open circuits ocasionally resulted from a failure of the photoresist to fully cover an undercut in the contacts adjacent the circuit element layer.

It is an object of the present invention to provide a process for forming more reliable thin-film circuit devices than heretofore accomplished.

Another object of the present invention is to provide a process for selectively etching laminated structures to form circuit devices which more fully utilize available space for greater quantities of devices.

Another object of the present invention is to provide a process for forming thin-film circuit devices in which the bounds of the contacts and the circuit element layer are defined by a single photoresist layer.

In accordance with the present invention, a laminated structure is provided which includes a substrate covered by a thin-film layer of circuit material, covered by an intermediate layer of conductive material which in turn is covered by a conductive layer. The conductive layer is selectively etched to define a cavity exposing the intermediate layer, the cavity being dimensioned so as to ultimately define the dimension between contacts for the circuit element. Thereafter, the conductive, intermediate and thin-film layers are selectively etched to define the bounds of the circuit element, including the contacts.

One feature of the present invention resides in the fact that the intermediate layer between the conductive and thin-film layers is selectively etched from the region between the formed contacts after the bounds of the element have been defined. This provision assures protection for the thin-film layer during its fabrication to significantly reduce the chances of circuit failure.

Yet another feature of the present invention resides in the provision that the cavity etched into the conductive layer is dimensionally wider than the intended width of the completed circuit device.

The above and other features of this invention will be more fully understood from the following detailed description and the accompanying drawings, in which:

FIGS. 1, 3, 5, 7, 9 and 11 are top view elevations of a laminated structure showing various steps of the process in accordance with the presently preferred embodiment of the present invention; and FIGS. 2, 4, 6, 8, 10 and 12 are side views in cutaway cross-section taken at lines 2—2, 4—4, 6—6, 8—8, 10—10 and 12—12 in FIGS. 1, 3, 5, 7, 9 and 11, respectively.

Referring to the drawings, there is illustrated a laminated structure comprisinng substrate 20 covered by thin-film layer 21 constructed of element material. By way of example, in the event that the device to be fabricated is a resistor, layer 21 will be a resistive material. Although the present invention will be described in connection with the formation of a resistor, it is to be understood that the invention is equally applicable to other types of circuit elements, including active devices such as transistors and diodes, in which case layer 21 will be constructed of a suitable material. Intermediate layer 22 covers layer 21, and conductive layer 23 covers layer 22. Substrate 20 may be constructed of any suitable substrate material, such as alumina ceramic. Layer 21, in the case of a resistor, may be constructed of Nichrome, and may have a thickness of about 100 to 200 angstroms, depending upon the intended resistance value. Intermediate layer 22 is preferably constructed of a conductive material, such as nickel, and has a thickness in the order of about 2,000 angstroms. Conductive layer 23 is likewise constructed of a conductive material, such as gold, and has a thickness of about 38,000 angstroms.

Figure 2:
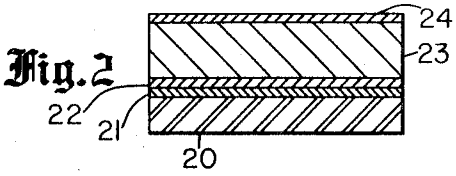
Figure 3:
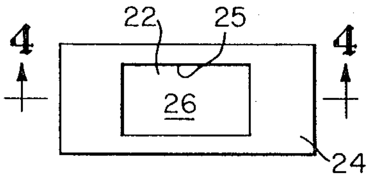
Figure 4:
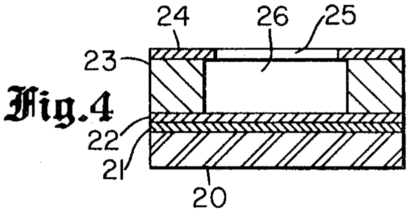
Figure 5:
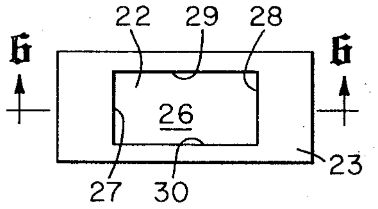
Figure 6:
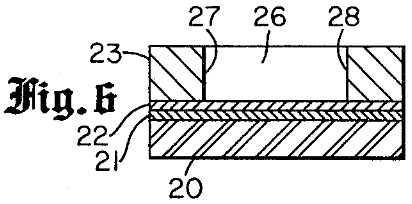

As illustrated in FIGS. 1 and 2, conductive layer 23 is overlayed with a layer of photoresist 24. By way of example, photoresist layer 24 may be Kodak Auto-Positive-3, a positive photorosist commercially available from Eastman Kodak Company of Rochester, N.Y. A mask, (not shown), is registered over layer 24 and the layer is exposed and developed to form a substantially rectangular aperture 25 in the photoresist layer (FIG. 3). A suitable etchant is applied through aperture 25 to etch cavity 26 into conductive layer 23 to expose a surface of intermediate layer 22. Cavity 26 is preferably rectangular in shape, having side walls 27–30. The distance between surfaces 27 and 28 accuruately defines the dimension between the ultimate contacts to be formed from layer 23. It is preferred that the distance between surfaces 29 and 30 of cavity 26 be greater than the intended width for the resistor element. It is to be understood, however, that a slot may be etched across the width of the laminated structure so that walls 29 and 30 will not appear. Further, if the process is utilized for fabricating several circuit devices at the same time, the cavity, or slot, as the case may be, may be utilized across several intended devices. As illustrated particularly in FIGS. 3 and 4, the etchant will undercut the bounds of aperture 25 in photoresist layer 24. However, the degree of undercut may be predicted by known techniques so that the distance between surfaces 27 and 28 of cavity 26 may be precisely defined.

Figure 7:
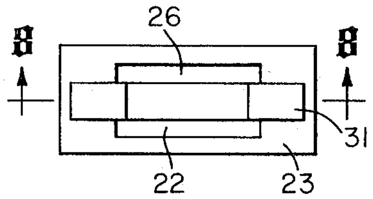
Figure 8:
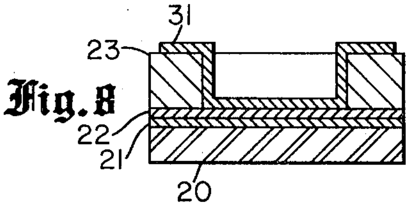
Figure 9:
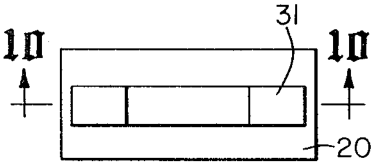
Figure 10:
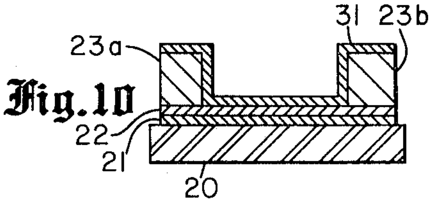
Figure 11:
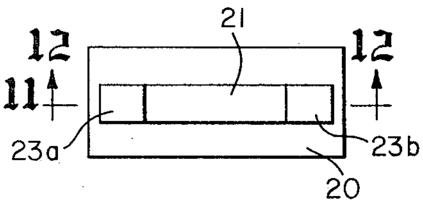
Figure 12:
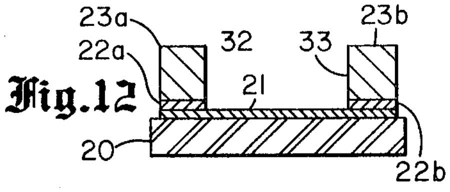

Upon completion of cavity 26, photoresist layer 24 is washed away or removed by well known techniques, and a second photoresist layer 31 is disposed over the exposed portions of conductor layer 23 and intermediate layer 22. Thereafter, photoresist layer 31 is exposed through a mask (not shown) and developed to form a layer whose configuration over a portion of the remaining conductive layer 23 and the intermediate layer 22 conforms to the intended device, as illustrated in FIGS. 7 and 8. A first etchant, such as the etchant applied to form cavity 26, is applied to the device to etch away a portion of layer 23 to form completed contacts 23*a* and 23*b*. A second etchant is then applied to the device to etch away the exposed portions of intermediate layer 22. A third etchant is thereafter applied to etch away the exposed portions of thin-film layer 21 to complete the bounds of the circuit element. Thereafter, and as illustrated particularly in FIGS. 11 and 12, photoresist layer 31 is washed away, and the etchant applied to remove the intermediate layer is again applied to the device to etch away exposed portions of intermediate layer 22 to expose thin-film layer 21. The completed circuit device, which is illustrated in FIGS. 11 and 12 comprises the substrate supporting resistive layer 21 and having contacts 32 and 33. Contact 32 comprises intermediate layer 22*a* disposed over one end of resistive layer 21 and supporting conductive layer 23*a*, and contact 33 comprises intermediate layer 22*b* supported over the opposite end of resistive layer 21, and supporting conductive layer 23*b*.

It is preferred that the etchant utilized for each successive layer be of such a type as to not appreciably attack the other materials. By way of example, a suitable etchant for etching gold conductive layer 23 may be a solution of 120 grams potassium iodide (KI) and 80 grams iodine ($I_2$) in one liter of water and may be used at 70°C. It is preferred that the etching solution be acidic so that it will not attack the alkaline-attackable photoresist. The etchant for removing the nickel intermediate layer 22 may comprise a solution of 275 grams ferric chloride ($FeCl_3$) in 1 liter of water or, alternatively, a mixture of 4 parts of a solution of ammonium persulfate [$(NH_4)_2S_2O_8$] in one liter of water, and one part concentrated nitric acid ($HNO_3$). The etchant to remove excess portions of the Nichrome resistive layer may comprise 1 part of 20 percent acetic acid ($CH_3COOH$) in water and 5 parts of a solution of 60 grams potassium permanganate ($KMnO_4$) in water and 1 part of 20 percent acetic acid in water and 5 parts solution of 60 grams of sodium thiosulfate ($Na_2S_2O_3$) in water.

One feature of the present invention resides in the fact that the etchants utilized for etching the gold, nickel and Nichrome layers do not appreciably attack the other layers so that selective etchings can be accomplished without effecting the other layers.

Another feature of the invention resides in the fact that necessary portion of the resistive layer is protected by intermediate layer 22 while the resistive layer is etched. Hence, the contacts and resistive layer are fully formed prior to removal of excess intermediate layer. The gold contacts protect intermediate layer material sandwiched between the contacts and the thin-film layer while the exposed portions of the intermediate layer are etched away.

Another feature of the present invention resides in the fact that the masks used to expose the photoresist layers may be registered with the laminated structure in a minimum space. Hence, a greater quantity of circuit devices may be manufactured using the process according to the present invention.

This invention is not to be limited by the embodiment shown in the drawings and described in the description, which is given by way of example and not of limitation, but only in accordance with the scope of the appended claims.

What is claimed is:

1. A process for forming a thin-flim circuit device containing a circuit element and contacts comprising the steps of:

providing a laminated structure including a substrate having thereon a thin-film layer of material having electrical characteristics corresponding to those of the intended circuit element, the thin-film layer being covered by a first layer of conductive material until the desired bounds of the circuit element and contacts have been formed, and the first layer being covered by a second layer of conductive material;

applying a first layer of a photoresist over said second layer;

forming an image on said first layer of photoresist which defines predetermined dimensions between intended contacts;

developing said first layer of photoresist to form an aperture therein;

selectively etching a rectangular cavity through said second layer to expose a surface of said first layer, the dimension between a first pair of opposite side walls of said cavity being the same as the dimension between the intended contacts for said circuit device, and the dimension between a second pair of opposite side walls of said cavity being greater than the dimensional width of the circuit element;

removing remaining portions of said first layer of photoresist;

applying a second layer of photoresist over exposed portions of said first and second layers of conductive material;

forming an image on said second layer of photoresist which defines the desired bounds of the circuit device;

developing said second layer of photoresist, said developed second layer having a dimensional width less than said dimension between said second pair of opposite side walls and equal to the dimensional width of the circuit element;

subsequently selectively etching portions of said first, second and thin-film layers with first, second and third etchants respectively to leave portions of said first, second and thin-film layers coincident with the configuration of the desired bounds of the circuit device, each said layer being attacked by only its respective etchant, the remaining portions of said second layer forming a plurality of individual contacts;
removing remaining portions of said second layer of photoresist; and
subsequently selectively etching the exposed surface of said first layer to expose a surface of said thin-film layer between contacts formed of the remaining portions of said conductive layer.

2. A process according to claim 1 wherein the selective etching of said first, second and thin-film layers to form the bounds of said circuit device is accomplished by applying said first etchant to the remaining exposed portions of said second layer to expose a portion of said first layer, applying said second etchant to the remaining exposed portions of said first layer to expose a portion of said thin-film layer, applying said third etchant to the remaining exposed portions of said thinfilm layer, and subsequently removing said layer of photoresist to expose surfaces of said plurality of contacts and a surface of said first layer between said contacts.

3. A process according to claim 2 wherein the exposed surface of said first layer between said plurality of contacts is removed by applying said second etchant to the exposed surface of said first layer after removing said second layer of photoresist.

4. The process according to claim 1 wherein the material forming said circuit element is an electrically resistive material.

5. The process according to claim 4 wherein said electrically resistive material is Nichrome.

6. The process according to claim 1 wherein said second layer of conductive material is different from the conductive material of said first layer.

7. The process according to claim 6 wherein said first layer of conductive material is nickel and said second layer of conductive material is gold.

* * * * *